United States Patent
Yuan

(10) Patent No.: US 12,551,684 B2
(45) Date of Patent: Feb. 17, 2026

(54) VENTILATION SWITCHING STRUCTURE OF NEGATIVE PRESSURE REGULATOR

(71) Applicant: BIBOTING INTERNATIONAL CO., LTD., Taoyuan (TW)

(72) Inventor: Li-Pin Yuan, Taoyuan (TW)

(73) Assignee: BIBOTING INTERNATIONAL CO., LTD., Taoyuan (TW)

( * ) Notice: Subject to any disclaimer, the term of this patent is extended or adjusted under 35 U.S.C. 154(b) by 10 days.

(21) Appl. No.: 18/244,626

(22) Filed: Sep. 11, 2023

(65) Prior Publication Data

US 2025/0082919 A1 Mar. 13, 2025

(51) Int. Cl.
*A61M 39/22* (2006.01)
*A61H 9/00* (2006.01)
(Continued)

(52) U.S. Cl.
CPC ......... *A61M 39/223* (2013.01); *A61H 9/0057* (2013.01); *F16K 11/085* (2013.01);
(Continued)

(58) Field of Classification Search
CPC .......... A61M 39/223; A61M 2039/224; A61M 1/06–0697; A61M 1/08; A61M 1/74; A61M 1/741; A61M 1/90; A61M 1/912; A61M 1/915; A61M 1/918; A61M 27/00; F16K 1/50; F16K 1/523; F16K 3/32;
(Continued)

(56) References Cited

U.S. PATENT DOCUMENTS 1,222,494 A * 4/1917 Thomas ................. A61H 9/005
601/14
3,536,100 A * 10/1970 Shum, Jr. ............... F16K 11/085
251/175
(Continued)

FOREIGN PATENT DOCUMENTS

CN 2889263 Y 4/2007
CN 114712699 A 7/2022
(Continued)

OTHER PUBLICATIONS

Office Action dated Oct. 30, 2023 of the corresponding Taiwan patent application No. 112126146.

*Primary Examiner* — Kevin F Murphy
*Assistant Examiner* — Jonathan J Waddy
(74) *Attorney, Agent, or Firm* — HDLS IPR SERVICES; Chun-Ming Shih

(57) ABSTRACT

A ventilation switching structure includes a valve, a switching cylinder, and a knob. The valve includes a receiving room, a main tube and branch tubes. The main tube is connected with a negative pressure instrument and connected to the receiving room. The branch tubes are located on two sides of the main tube. The switching cylinder is rotatably disposed in the receiving room and includes a main channel, multiple lateral channels, and a blocking wall. The lateral channels communicate with the main channel and are disposed on a side of the blocking wall at intervals. The knob is connected on the switching cylinder. The knob is capable of rotating the switching cylinder to make the blocking wall optionally block one of the branch tubes so as to accomplish the object of ventilation switching.

7 Claims, 7 Drawing Sheets

(51) Int. Cl.
 *F16K 11/085* (2006.01)
 *A61M 1/00* (2006.01)
 *A61M 1/08* (2006.01)

(52) U.S. Cl.
 CPC ............ *A61M 1/08* (2013.01); *A61M 1/7413* (2021.05); *Y10T 137/86541* (2015.04); *Y10T 137/86823* (2015.04)

(58) Field of Classification Search
 CPC .. F16K 11/076; F16K 11/085; F16K 11/0853; F16K 11/0856; A61F 13/05; A61F 2013/00536; A61H 7/008; A61H 9/005; A61H 9/0057; A61H 2201/1238; A61H 2201/5056; Y10T 137/86541; Y10T 137/86823
 USPC ............ 137/625.15, 625.16, 625.19, 625.41; 251/287
 See application file for complete search history.

(56) References Cited

U.S. PATENT DOCUMENTS

| | | | | |
|---|---|---|---|---|
| 3,986,397 | A * | 10/1976 | Perreault | G01K 17/10 374/E17.009 |
| 4,428,368 | A | 1/1984 | Torii | |
| 4,809,949 | A * | 3/1989 | Rakieski | F16K 11/0876 251/312 |
| 5,037,067 | A * | 8/1991 | Ray | F16K 5/0478 251/900 |
| 5,816,290 | A * | 10/1998 | Altshuler | F16K 11/085 137/625.47 |
| 5,901,945 | A * | 5/1999 | Schalk | F16K 5/0478 251/309 |
| 2006/0237359 | A1* | 10/2006 | Lin | F16K 11/085 210/438 |
| 2007/0261745 | A1* | 11/2007 | Hollis | F16K 11/076 137/625.47 |
| 2008/0265200 | A1* | 10/2008 | Wang | F16K 11/085 251/304 |
| 2009/0120519 | A1* | 5/2009 | Chen | F16K 11/0853 137/625.46 |
| 2012/0305115 | A1* | 12/2012 | Bartnick | F16J 15/062 137/625 |
| 2017/0363220 | A1* | 12/2017 | Yan | F16K 11/085 |
| 2018/0346306 | A1* | 12/2018 | Carpino | F16K 11/085 |
| 2023/0406472 | A1* | 12/2023 | Long | F16K 11/0853 |

FOREIGN PATENT DOCUMENTS

| | | |
|---|---|---|
| JP | S56-11828 U | 1/1981 |
| JP | 2001-124222 A | 5/2001 |
| JP | 2007-139010 A | 6/2007 |
| JP | 3224830 U | 1/2020 |

\* cited by examiner

VENTILATION SWITCHING STRUCTURE OF NEGATIVE PRESSURE REGULATOR

BACKGROUND

Technical Field

The disclosure relates to a negative pressure regulator, particularly to a ventilation switching structure of a negative pressure regulator.

Related Art

A negative pressure instrument is an appliance for treatment and healthcare which is used for stimulating acupuncture points on the skin surface by negative pressure sucking, so as to promote blood circulation and relieve discomfort to accomplish the object of adjustment of body functions.

Usually, pressure of a negative pressure instrument can be adjusted by a negative pressure regulator. In addition, a negative pressure regulator is usually disposed with multiple branch tubes to connect with multiple negative pressure cups. However, when only one negative pressure cup is operated, those branch tubes which are not connected with the negative pressure cups should be respectively sealed plug caps. This results in inconvenience in use. Further, if a plug cap does not completely close a branch tube, it will cause gas leakage to affect use.

In view of this, the inventors have devoted themselves to the above-mentioned prior art, researched intensively and cooperated with the application of science to try to solve the above-mentioned problems. Finally, the invention which is reasonable and effective to overcome the above drawbacks is provided.

SUMMARY

An object of this disclosure is to provide a ventilation switching structure of a negative pressure regulator, whose knob drives the switching cylinder to rotate to be able to make the blocking wall optionally block one of the branch tubes so as to accomplish the object of ventilation switching.

To accomplish the above object, this disclosure is a ventilation switching structure of a negative pressure regulator, used for connecting with a negative pressure instrument, which includes a valve, a switching cylinder, and a knob. The valve includes a receiving room, a main tube, and a pair of branch tubes. The main tube is used for connecting with the negative pressure instrument and is connected to the receiving room. The pair of branch tubes is correspondingly located on two sides of the main tube. The switching cylinder is rotatably disposed in the receiving room and includes a main channel, multiple lateral channels, and a blocking wall. The lateral channels communicated with the main channel are disposed at a side of the blocking wall and at intervals. The knob is connected on the switching cylinder. The knob is capable of rotating the switching cylinder to make the blocking wall optionally block one of the branch tubes.

In an embodiment of this disclosure, the valve has a pair of limiting recesses disposed at a bottom side in the receiving room, the pair of limiting recesses is disposed on a top of the main tube and separated from each other, and each limiting recess is configured as an arcuate recess with an arc angle less than 180 degrees.

In an embodiment of this disclosure, the switching cylinder comprises a pair of latches, and the pair of latches are located on opposite sides of the main channel and engaged in the pair of limiting recesses respectively.

In an embodiment of this disclosure, the valve is formed with a flange on a side of each limiting recess, and each latch engages with the flange.

In an embodiment of this disclosure, each lateral channel is a sector open recess, and the switching cylinder has a partition plate disposed between the lateral channel adjacent to each other.

An embodiment of this disclosure further includes an air-seal ring, the switching cylinder is disposed with an annular groove on an outside of the lateral channels, and the air-seal ring is disposed in the annular groove to abut against an inner wall of the receiving room.

In an embodiment of this disclosure, the annular groove is an oval groove.

In an embodiment of this disclosure, the valve is disposed with multiple vents, and the vents are disposed on the inner wall of the receiving room and corresponding to positions of the pair of branch tubes.

In an embodiment of this disclosure, the vents are disposed in pairs at junctions between the receiving room and the branch tubes, and the valve has a blocking plate formed between the vents adjacent to each other.

An embodiment of this disclosure further includes an O-ring, a side of the switching cylinder facing to the main tube, is disposed with a recessed groove, and the O-ring is disposed in the recessed groove to abut against a top side of the main tube.

In comparison with the related art, the negative pressure regulator of this disclosure includes a valve and a switching cylinder rotatably disposed in the valve. The switching cylinder includes a main channel, multiple lateral channels, and a blocking wall. The lateral channels communicate with the main channel and are disposed at a side of the blocking wall and at intervals. The knob drives the switching cylinder to rotate to be able to make the blocking wall optionally block one of the branch tubes to make ventilation switching. This can save the process of using a plug cap to close the unused branch tube of the related-art negative pressure regulator when only one negative pressure cup is being used so as to improve convenience and utility of the negative pressure regulator of this disclosure in use.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
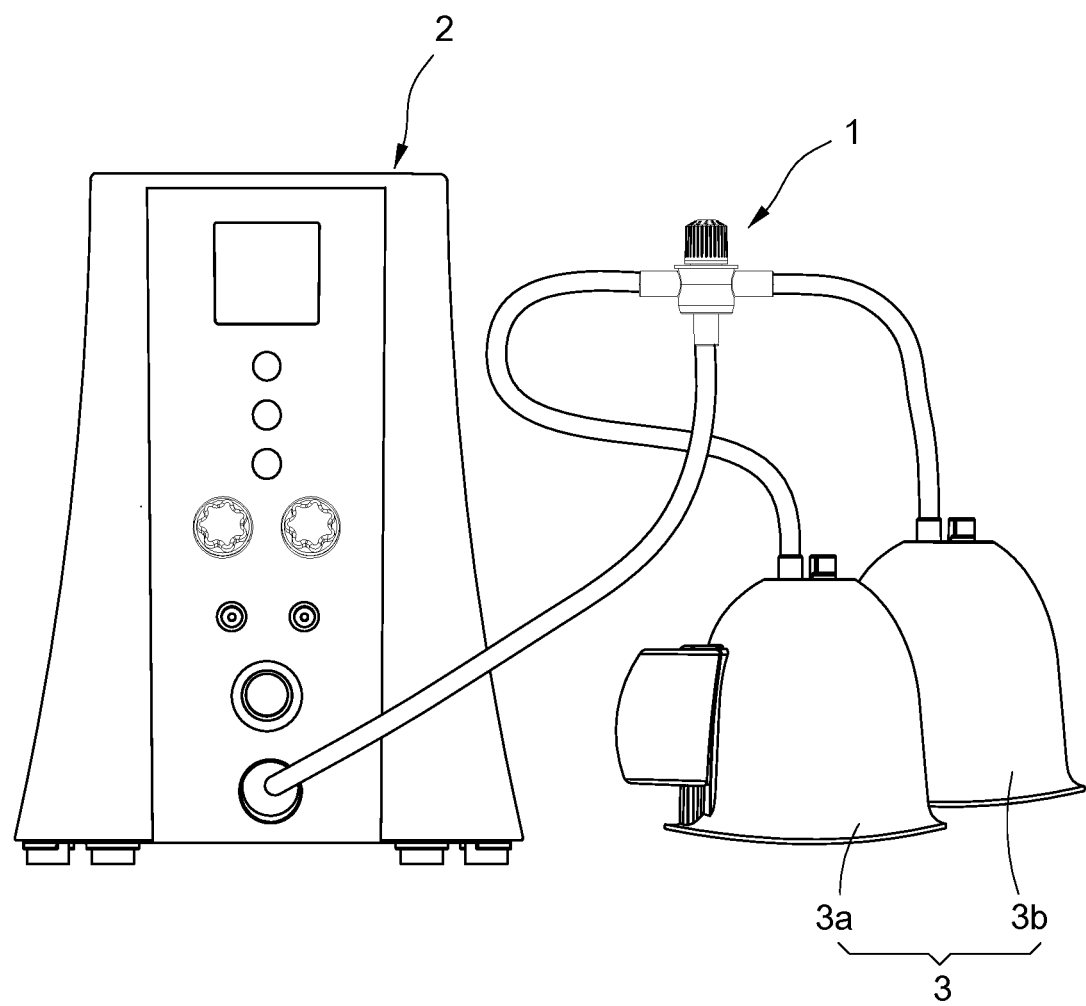
FIG. 1 is a schematic view of an application of the negative pressure regulator of this disclosure.

Please refer to FIG. 1, which is a schematic view of an application of the negative pressure regulator of this disclosure. The negative pressure regulator 1 of this disclosure is disposed between a negative pressure instrument 2 and multiple negative pressure cups 3. In the embodiment, the negative pressure cups 3 include a first negative pressure cup 3a and a second negative pressure cup 3b. In addition, the negative pressure regulator 1 is disposed with a ventilation switching structure used for connecting with the negative pressure instrument 2 and the negative pressure cups 3. Also, the ventilation switching structure of this disclosure may be used for switching to alternatively use the first negative pressure cup 3a, use the second negative pressure cup 3b or simultaneously use both of the first negative pressure cup 3a and the second negative pressure cup 3b.

Figure 2:
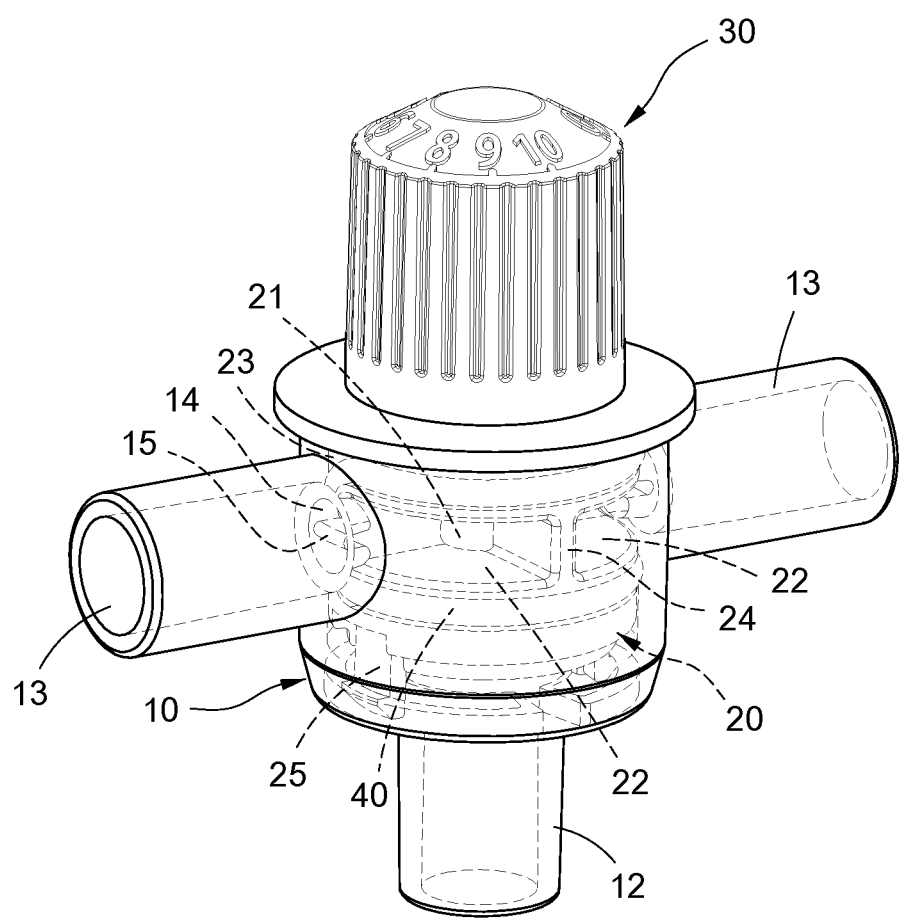
FIG. 2 is a perspective schematic view of the negative pressure regulator of this disclosure.
Figure 3:
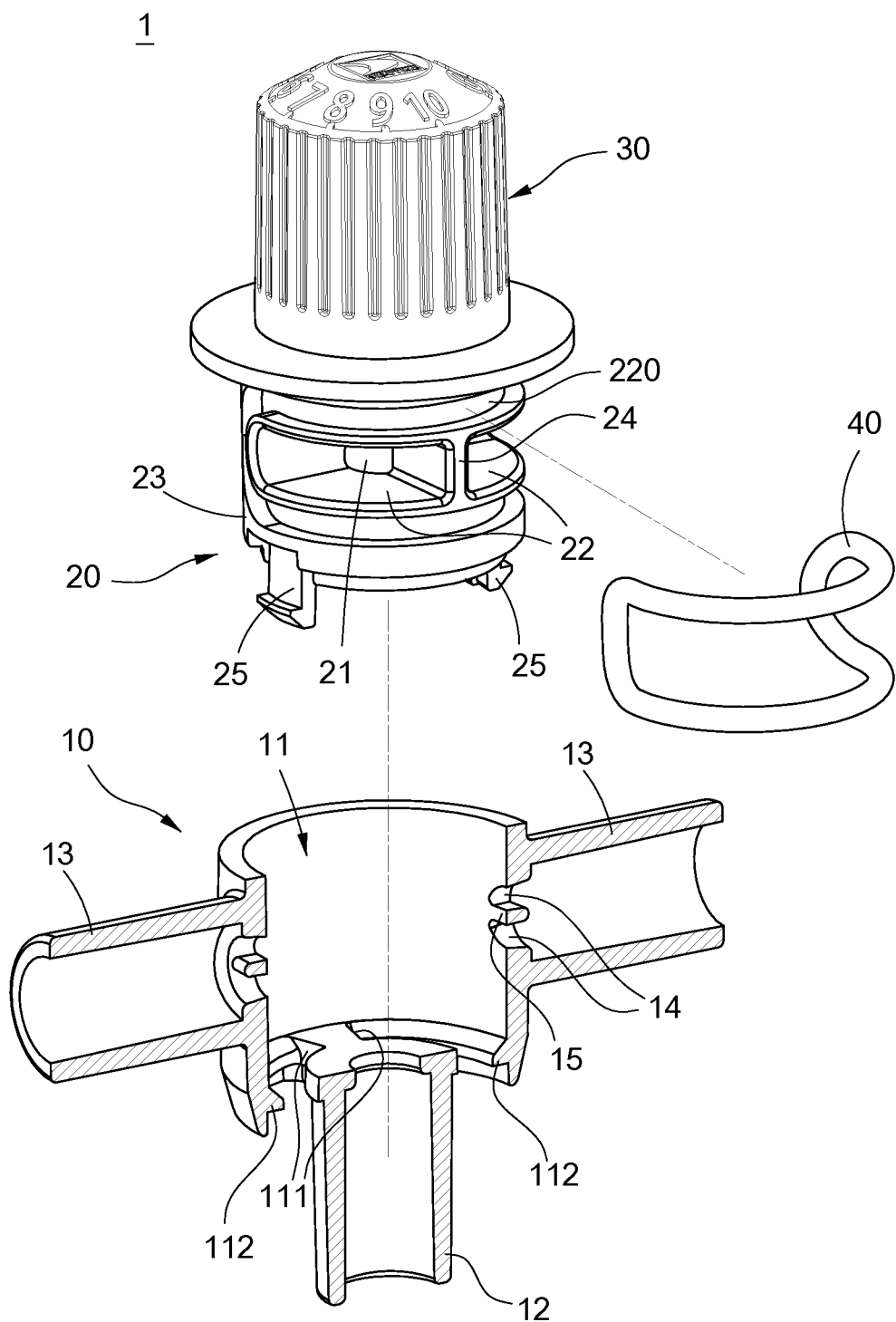
FIG. 3 is an exploded schematic view of the negative pressure regulator of this disclosure.
Figure 4:
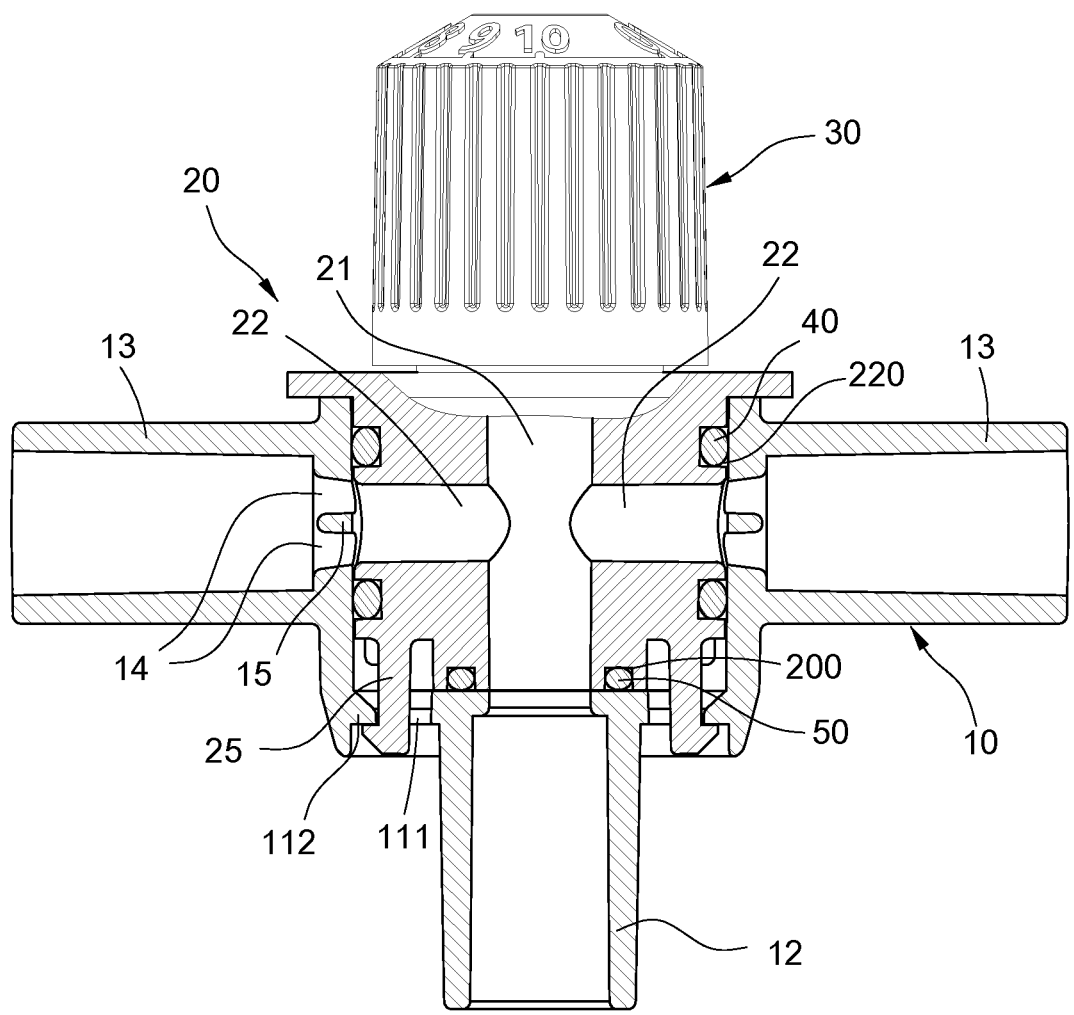
FIG. 4 is an assembled cross-sectional view of the negative pressure regulator of this disclosure.

Please refer to FIGS. 2-4, which are a perspective schematic view, an exploded schematic view, and an assembled cross-sectional view of the negative pressure regulator of this disclosure.

This disclosure is a ventilation switching structure of the negative pressure regulator 1, which includes a valve 10, a switching cylinder 20 and a knob 30. The switching cylinder 20 is placed in the valve 10. The knob 30 is connected on the switching cylinder 20 to be able to drive the switching cylinder 20 to rotate.

The valve 10 includes a receiving room 11, a main tube 12 and a pair of branch tubes 13. The main tube 12 is used for connecting with the negative pressure instrument 2 (referring to FIG. 1) and is connected to the receiving room 11. The pair of branch tubes 13 is used for connecting with the negative pressure cups 3 (referring to FIG. 1) and is correspondingly located on two sides of the main tube 12.

In detail, the valve 10 is disposed with a pair of limiting recesses 111 at a bottom side in the receiving room 11. The pair of limiting recesses 111 are correspondingly located at a side of the pair of branch tubes 13, respectively. In addition, the valve 10 is disposed with multiple vents 14. The vents 14 are disposed on an inner wall of the receiving room 11 corresponding to positions of the pair of branch tubes 13. In detail, the vents 14 are disposed in pairs at the junctions between the receiving room 11 and the branch tubes 13. The valve 10 has a blocking plate 15 formed between the vents 14 adjacent to each other. The arrangement of the blocking plate 15 may be used to block entry of foreign matters and enhance structural strength of the receiving room 11.

The switching cylinder 20 is rotatably disposed in the receiving room 11 and includes a main channel 21, multiple lateral channels 22 and a blocking wall 23. The lateral channels 22 are communicated with the main channel 21 and disposed at intervals at a side of the blocking wall 23. Further, the knob 30 is combined on the switching cylinder 20. The knob 30 ins capable of rotating the switching cylinder 20 to make the blocking wall 23 optionally block one of the branch tubes 13.

In this embodiment, each lateral channel 22 is a sector open recess, and the switching cylinder 20 has a partition plate 24 formed between the branch channels 22 adjacent to each other. In addition, the switching cylinder 20 includes a pair of latches 25. The pair of latches 25 is located on opposite sides of the main channel 21 and separately engaged in the pair of limiting recesses 111. In some embodiments, the valve 10 is formed with a flange 112 on a side of each limiting recess 111. Also, each latch 25 engages with the flange 112.

In an embodiment of this disclosure, the ventilation switching structure of the negative pressure regulator 1 further includes an air-seal ring 40. Also, the switching cylinder 20 is disposed with an annular groove 220 on an outside of the lateral channels 22. The annular groove 220 is arranged to be an oval groove. The air-seal ring 40 is disposed in the annular groove 220 to abut against the inner wall of the receiving room 11.

In addition, the ventilation switching structure of the negative pressure regulator 1 further includes an O-ring 50. Also, a recessed groove 200 is arranged at a side of the switching cylinder 20 facing to the main tube 12. The O-ring 50 is disposed in the recessed groove 200 to abut against a top side of the main tube 12.

Figure 5:
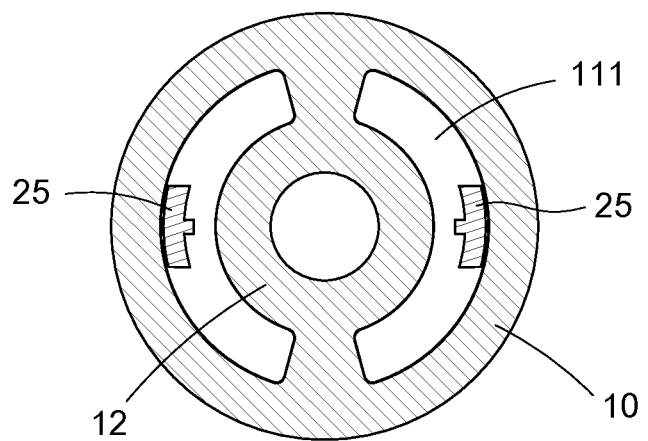
FIG. 5 is a cross-sectional schematic view of this disclosure, which shows that the hook of the switching cylinder stretches into the limiting recess of the valve.

Please refer to FIG. 5, which is a cross-sectional schematic view of this disclosure, showing that the latch 22 of the switching cylinder 20 stretches into the limiting recess 111 of the valve 10. The valve 10 of this disclosure is disposed with a pair limiting recesses 111. The pair of limiting recesses 111 is disposed on the top of the main tube 12 and is separately configured into an arcuate recess with an arc angle slightly less than 180 degrees. Thereby, when the switching cylinder 20 rotates relative to the valve 10, the latch 25 of the switching cylinder 20 will shift in the limiting recess 111 and make the rotating angle of the switching cylinder 20 limited.

Figure 6:
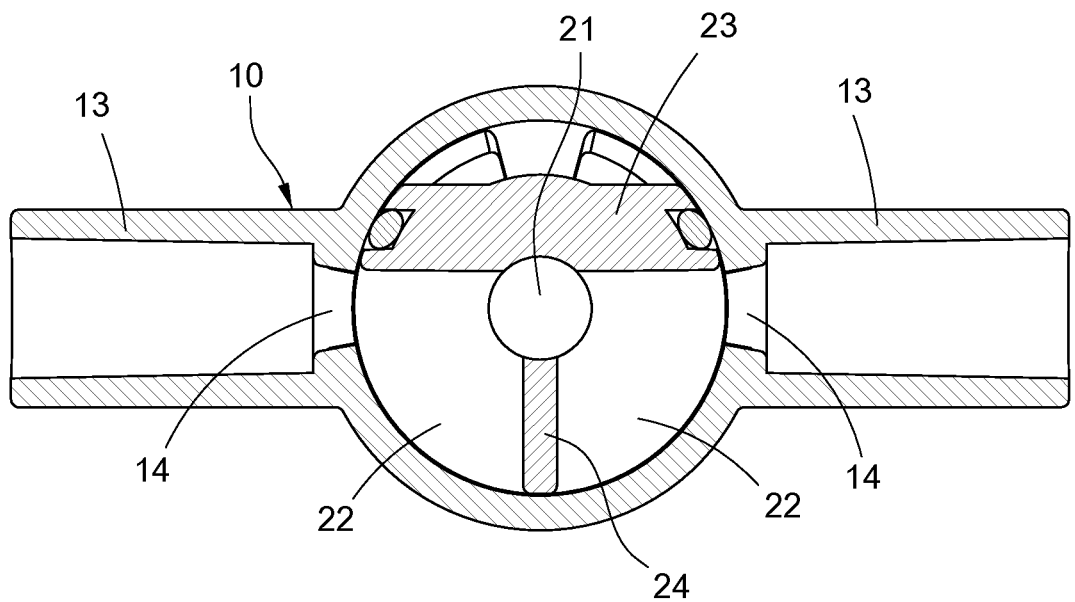
FIG. 6 is an assembled cross-sectional view of this disclosure, which shows that the switching cylinder is placed in the receiving room.

Please refer to FIG. 6, which is an assembled cross-sectional view of this disclosure, which shows that the switching cylinder 20 is placed in the receiving room 11. The switching cylinder 20 includes a main channel 21, two lateral channels 22, a blocking wall 23 and a partition plate 24 for separating the lateral channels 22. Each lateral channel 22 is of a sector shape and communicated with the main channel 21. The blocking wall 23 is located on a side of the two lateral channels 22.

Also, the valve 10 includes a receiving room 11, two branch tubes 13 and multiple vents 14. The switching cylinder 20 is rotatably received in the receiving room 11. The switching cylinder 20 may select the rotating direction and the rotating angle to use blocking wall 23 to block the vents 14 on one side to supply air to the branch tube 13 on one side.

It is noted that when the switching cylinder 20 does not rotate and is located at a position as shown in FIG. 6, the blocking wall 23 does not block any vent 14 to simultaneously use the vents 13 on two sides to supply air.

Figure 7:
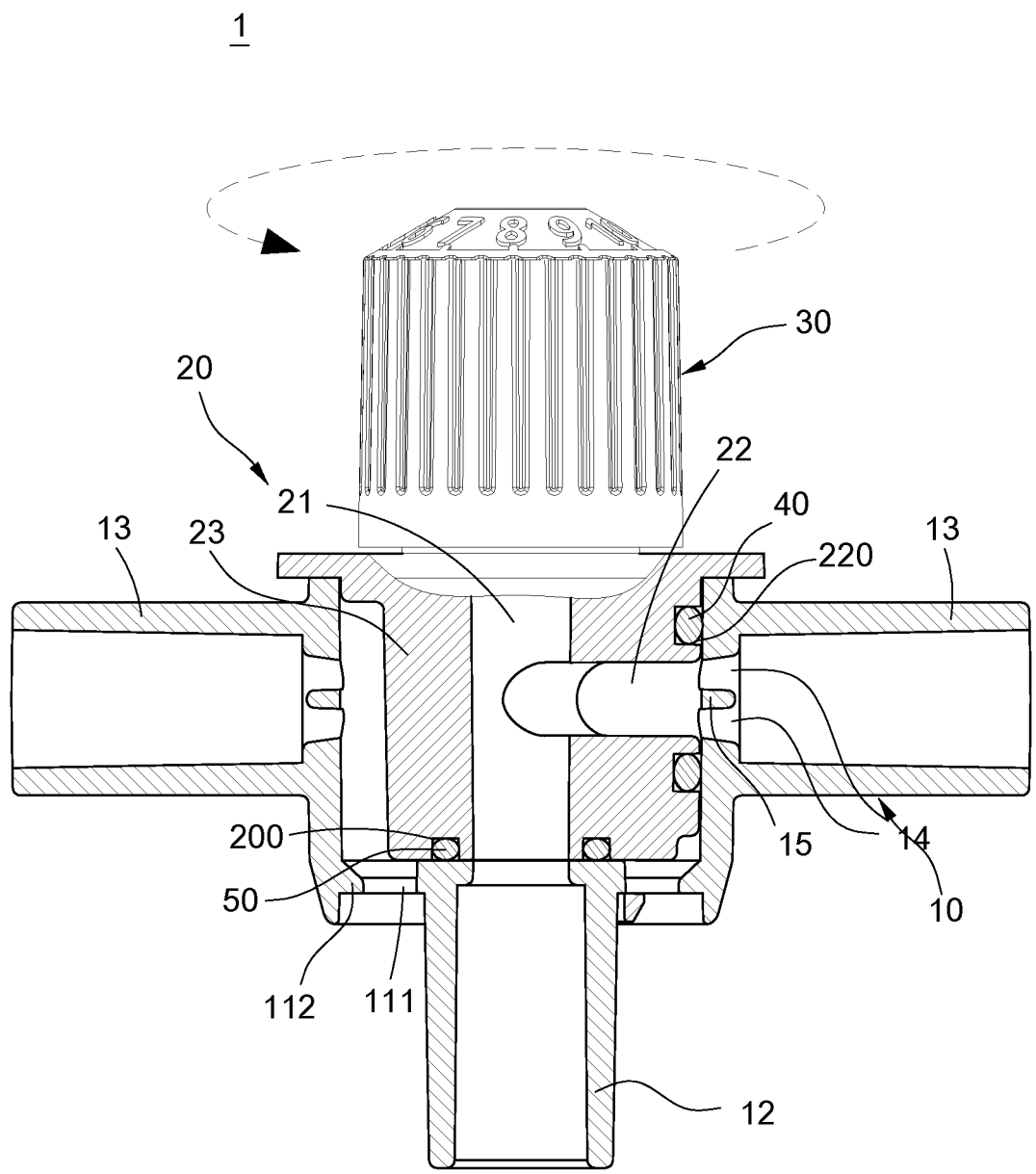
FIGS. 7-9 are schematic views showing the rotation of the knob of the negative pressure regulator of this disclosure.
Figure 8:
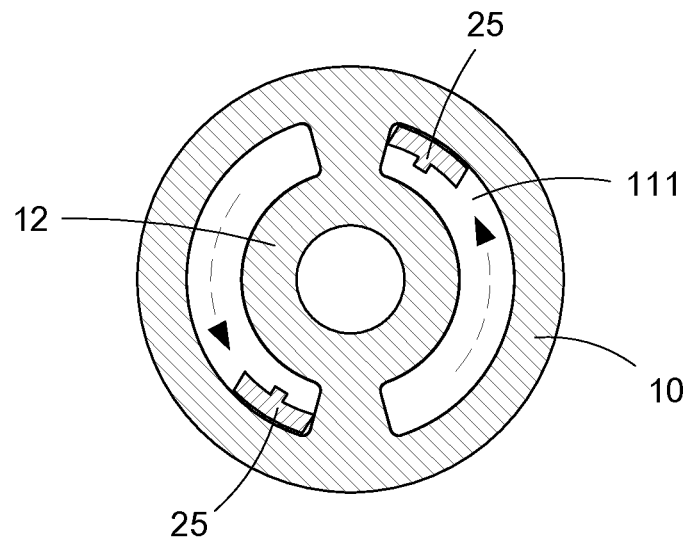
Figure 9:
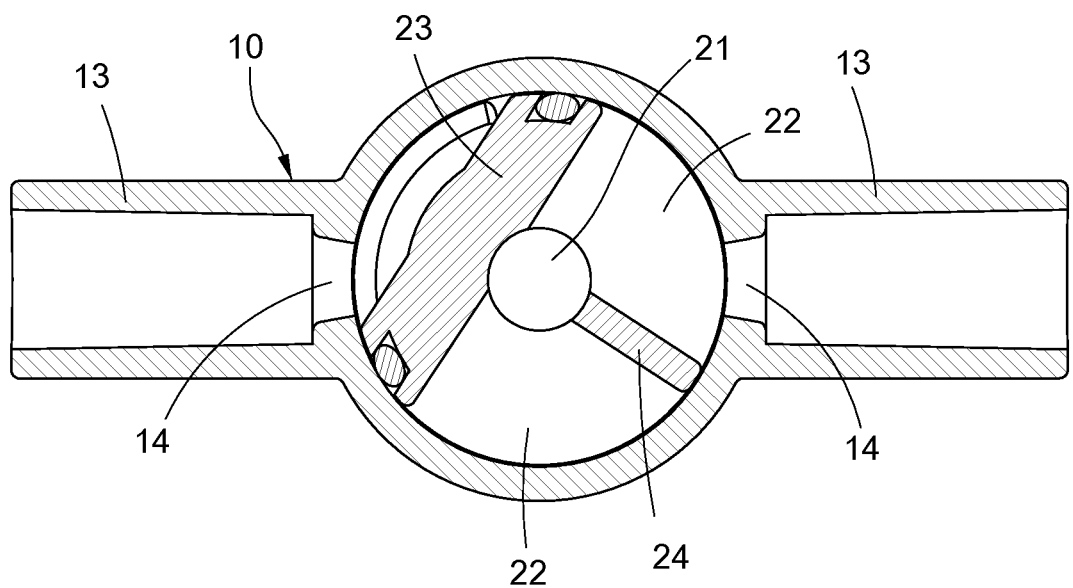

Please refer to FIGS. 7-9, which are schematic views showing the rotation of the knob 30 of the negative pressure regulator of this disclosure. The negative pressure regulator 1 of this disclosure may use the knob 30 to make ventilation switching. When the knob 30 is rotated counterclockwise (FIG. 7), the pair of latches 25 will shift in the pair of limiting recesses 111. Also, after the knob 30 is rotated to a specific angle, the pair of latches 25 will be blocked by the edge of the limiting recess 111 to be unable to rotate (FIG. 8). At this time, the blocking wall 23 blocks the vent 14 on the left side to make the branch tube 13 on the right side useless. Also, gas flows from the main channel 21 into the lateral channel 22, and then flows from the vent 14 on the right side into the branch tube 13 on the right side to make ventilation switching.

Similarly, when the knob 30 is rotated clockwise, the blocking wall 23 blocks the vent 14 on the right side to make the branch tube 13 on the right side useless. Also, gas flows from the main channel 21 into the lateral channel 22, and then flows from the vent 14 on the left side into the branch tube 13 on the left side to make ventilation switching.

While this disclosure has been described by means of specific embodiments, numerous modifications and variations could be made thereto by those skilled in the art without departing from the scope and spirit of this disclosure set forth in the claims.

What is claimed is:

1. A negative pressure device, comprising:
   a negative pressure instrument;
   a valve, comprising a receiving room, a main tube and a pair of branch tubes, the main tube being used for connecting with the negative pressure instrument and connected to the receiving room, and the pair of branch tubes being correspondingly located on two sides of the main tube;
   a switching cylinder, rotatably disposed in the receiving room, comprising a main channel, two separate lateral channels and a blocking wall, the two separate lateral channels being communicated with the main channel, and the two separate lateral channels being disposed at a side of the blocking wall and at intervals;
   a plurality of negative pressure cups, including a first negative pressure cup and a second negative pressure cup connected to the pair of branch tubes, respectively; and
   a knob, connected to the switching cylinder, the knob being capable of rotating the switching cylinder to make the blocking wall optionally block one of the branch tubes to selectively use the first negative pressure cup or the second negative pressure cup, or make the blocking wall block neither one of the branch tubes to simultaneously use both of the first negative pressure cup and the second negative pressure cup;
   wherein the valve comprises a pair of limiting recesses disposed at a bottom side in the receiving room, the pair of limiting recesses is disposed on a top of the main tube and separated from each other, and each limiting recess is configured as an arcuate recess with an arc angle less than 180 degrees;
   wherein the switching cylinder comprises a pair of latches protruding out of the valve, and the pair of latches are located on opposite sides of the main channel and engaged in the pair of limiting recesses, respectively;
   wherein the valve is formed with a flange on a side of each limiting recess, and each latch engages with the flange by a hook of the latch contacting on an outer surface of the flange.

2. The negative pressure device of claim 1, wherein each lateral channel is a sector open recess, and the switching cylinder comprises a partition plate disposed between the two separate lateral channels adjacent to each other.

3. The negative pressure device of claim 1, further comprising an air-seal ring, wherein the switching cylinder has an annular groove on an outside of the lateral channels, and the air-seal ring is disposed in the annular groove to abut against an inner wall of the receiving room.

4. The negative pressure device of claim 3, wherein the annular groove is an oval groove.

5. The negative pressure device of claim 1, wherein the valve has multiple vents, and the vents are disposed on an inner wall of the receiving room and corresponding to positions of the pair of branch tubes.

6. The negative pressure device of claim 5, wherein the vents are disposed in pairs at junctions between the receiving room and the branch tubes, and the valve comprises a blocking plate formed between the vents adjacent to each other.

7. The negative pressure device of claim 1, further comprising an O-ring, wherein a side of the switching cylinder facing the main tube, has a recessed groove, and the O-ring is disposed in the recessed groove to abut against a top side of the main tube.

\* \* \* \* \*